United States Patent
Duck et al.

[19]

[11] Patent Number: 5,629,995
[45] Date of Patent: May 13, 1997

[54] WAVELENGTH FILTER ARRANGEMENTS FOR USE IN FIBER OPTICS

[75] Inventors: Gary S. Duck, Nepean; Yihao Cheng, Kanata, both of Canada

[73] Assignee: JDS Fitel Inc., Nepean, Canada

[21] Appl. No.: 595,487

[22] Filed: Feb. 1, 1996

[51] Int. Cl.⁶ .............................. G02B 6/28; H04J 14/02
[52] U.S. Cl. .................. 385/24; 385/31; 385/34; 385/33; 385/47; 359/124; 359/131
[58] Field of Search ................................ 385/15, 16, 17, 385/18, 24, 27, 33, 34, 46, 47, 31; 359/114, 115, 124, 131

[56] References Cited

U.S. PATENT DOCUMENTS

| | | | |
|---|---|---|---|
| 4,449,782 | 5/1984 | Korth | 385/24 X |
| 4,474,424 | 10/1984 | Wagner | 385/24 X |
| 4,550,975 | 11/1985 | Levinson et al. | 385/34 X |
| 4,880,289 | 11/1989 | Imoto et al. | 385/24 X |
| 5,005,935 | 4/1991 | Kunikane et al. | 385/24 X |
| 5,218,654 | 6/1993 | Sauter | 385/24 |

Primary Examiner—Brian Healy
Attorney, Agent, or Firm—Neil Teitelbaum & Associates

[57] ABSTRACT

A wavelength filter for use with optical fibers comprises a plurality of filter units, each unit comprising first and second collimating lenses separated by a filter element, the filter elements of the two units being capable of passing first and second wavelengths respectively, and each unit being such as to reflect light transmitted by the filter element of each of the other units. A first of the units has its first lens connected to an input optical fiber and also connected to a first connecting optical fiber positioned so that one of these optical fibers is capable of receiving light from the other fiber reflected off the filter element of the first unit. The first unit has its second lens connected to a second connecting optical fiber carrying light of a first wavelength transmitted from the input optical fiber through the first filter unit. A second of the units has its first lens connected to the first connecting optical fiber and its second lens connected to the second connecting optical fiber and to an output optical fiber in transmitted light relationship with the first connecting optical fiber. The second connecting optical fiber and the output optical fiber are positioned so that one of these latter fibers is capable of receiving light from the other reflected off the filter element of the second unit.

6 Claims, 5 Drawing Sheets

WAVELENGTH FILTER ARRANGEMENTS FOR USE IN FIBER OPTICS

FIELD OF THE INVENTION

The present invention relates to a filter arrangement for use in fiber optic circuits, capable of separating light signals of two or more particular wavelengths from an input light signal having a plurality of wavelengths. The arrangement may be used both for removing unwanted wavelengths from a mixture of wavelengths, or for separating two or more desirable wavelengths from other, undesirable wavelengths. Such arrangements are needed for example in wavelength division multiplexing (WDM) systems for transmitting optical signals of distinct wavelengths through a single optical fiber.

BACKGROUND OF THE INVENTION

One known form of WDM filters is a so-called dichoric filter, an example of which is shown in FIG. 1. Dichoric filter technology offers wide channel passbands, flat channel passbands, low insertion loss, moderate isolation, low cost, high reliability and ruggedness, high thermal stability, and moderate filter roll-off characteristics, The filter shown in FIG. 1 is a conventional three-port dichoric filter, and comprises one or more layers of dielectric material coated onto a glass substrate 10 with lenses 11 and 12 to focus the incoming and outgoing optical signals. The choice of dielectric material, the number of dielectric layers coated onto the substrate, and the spacing of the layers are chosen to provided the appropriate transmissive and reflective properties for a given target wavelength. For example, if $\lambda 1$ is the target wavelength to be transmitted through the filter, the number and spacing of the dielectric layers on the substrate 10 would be chosen to provided (1) a specified tolerance passband around $\lambda 1$, and (2) the necessary isolation requirements for all other transmitted wavelengths, for example a wavelength $\lambda 2$, transmitted by a second transmitter.

The dichoric filter unit is constructed by placing self-focusing lenses 10 and 11 on either side of a filter element comprising the dielectric substrate 10. These lenses, which are collimating lenses such as quarter-pitch GRIN (Graded Index) lenses or so-called "SELFOC" lenses (produced under the trade name "SELFOC"; the mark is registered in Japan and owned by the Nippon Sheet and Glass Co. Ltd.,) focus incoming light onto a particular location on the dielectric substrate filter element.

Attached to the lenses 11 and 12 through an adhesive bonding process are, typically, single mode optical fibers. For convenience, the location at which optical fibers attach to the lenses 11 and 12 are called ports: port 1 is P1, port 2 is P2, and port 3 is P3. Connected to the ports are optical fibers 14, 15, and 16 respectively. For example, all of the light (comprised of $\lambda 1$ and $\lambda 2$) passing through fiber 14 connected to port P1 is focused by lens 11 onto a single location on the dielectric substrate 10.

Since the substrate is coated to pass wavelengths around $\lambda 1$, virtually all of the light at $\lambda 1$ passes through the dielectric substrate 10 and, is collimated by lens 11 onto port P3, and passes away from the filter on optical fiber 16. Any other wavelength incident on the filter through port P1 (e.g. light of wavelength $\lambda 2$) is reflected off the multilayer substrate 10, focused back through the first lens 11 to port P2, and passes away from the filter unit on optical fiber 15. Likewise, the filter performs the same function for light travelling in the opposite direction.

Instead of the glass substrate 10, the filter element may be constituted by thin layers of dielectric material 10a coated on the end of one of the lenses 11, with the other lens 12 also having its inner end secured to this material. This is illustrated in FIG. 1a.

In these filters, the light suffers attenuation both in transmittance through the filter element and in reflectance off the filter element, the loss in transmittance being larger than the loss in reflectance. The attenuation is measured as transmission and reflectance attenuation ratios T and R for transmittance and reflectance respectively, i.e:

Light intensity input x T=Intensity of light transmitted;

Light intensity input x R=Intensity of light reflected, where both T and R<Unity; and T<R The types of filter shown in FIGS. 1 and 1a are suitable for separating out one wavelength of light from a light signal containing a mixture of wavelengths, or for separating a light signal containing two different wavelengths into light signals having the separate wavelengths. However, it is sometimes required to separate out more than one wavelength from a plurality of more than two wavelengths, and to have the resultant mixed wavelengths leaving from a single fiber. It may also be desirable to use a filter arrangement in which all the separated wavelengths had the same amount of attenuation when passing through the filters.

SUMMARY OF THE INVENTION

A simple device for separating two desirable (or undesirable) wavelengths of light from a light signal containing a plurality of wavelengths is illustrated in FIG. 2. As shown, an input optical fiber 14 carrying light of wavelengths $\lambda 1, \lambda 2, \lambda 3, \lambda 4 \ldots$ is attached at port P1 to a first lens 11 of a dichoric filter unit A which, as in FIG. 1a, has filter element 10a formed of thin films positioned between the first lens 11 and the second lens 12. The first lens 11 is also connected at port P2 to a first connecting optical fiber 15, the port P2 being positioned to receive light from port P1 reflected off the filter element 10a. The second lens 12 is connected via port P3 to a second connecting optical fiber 16. The filter element 10a is selected to transmit light of wavelength $\lambda 1$ to fiber 16 and to reflect light of all other wavelengths into fiber 15; the latter may also be termed a reflected light fiber.

The first connecting fiber 15 in turn forms an input into the first lens 11" of a second filter unit B, which is similar to unit A but which has a filter element 10b designed to transmit light of wavelength $\lambda 3$ but to reflect all other wavelengths. Accordingly, the light which passes out of this filter unit through output optical fiber 16', attached to Port P4 of second lens 12', carries light of wavelength $\lambda 3$, while the remaining light of wavelengths $\lambda 2, \lambda 4 \ldots$ passes out of the system via a second reflected light fiber 15'.

This provides suitable separation of the light of wavelengths $\lambda 1$ and $\lambda 2$ from the remaining wavelengths. However this simple system leaves the two outputs separate, whereas it would be desirable to have a compact unit in which all the necessary separation was performed and which had a single output fiber carping the separated wavelengths. Also, it may be desirable that all the signals being separated had the same amount of attenuation. Here, the two desired signals, ie. those containing wavelengths $\lambda 1$ and $\lambda 2$, have different amounts of attenuation. The intensity of the $\lambda 1$ output light signal is $\lambda 1T$, while the intensity of the $\lambda 2$ light signal is $\lambda 2RT$.

The invention provides a system in which all of the separated light signals are combined into the same output optical fiber. These may also have the same amount of attenuation.

In accordance with the invention, a wavelength filter is similar to that of FIG. 2 in comprising a plurality of filter units, each unit comprising first and second collimating lenses separated by a filter element, and in that the filter elements of the two units are capable of passing first and second wavelengths respectively, each filter element being such as to reflect light transmitted by the filter element of each of the other units. Also, as in FIG. 2, a first of said units has its first lens connected to an input optical fiber and to a first connecting optical fiber by a port positioned so that the first connecting optical fiber is capable of receiving light from the first optical fiber reflected off the filter element of the first unit, and the first unit has its second lens connected to a second connecting optical fiber carrying light of a first wavelength transmitted from the input optical fiber through the first filter unit; and in that a second of the units has its first lens connected to said first connecting optical fiber. This preferred arrangement however differs from what has been described in that the second unit has its second lens connected not only to output optical fiber in transmitted light relationship with the first connecting optical fiber, but also to the second connecting optical fiber. The second connecting optical fiber and the output optical fiber have ports positioned so that the output optical fiber is capable of receiving light from the second connecting optical fiber which has been reflected off the filter element of the second unit.

In this new arrangement, the light signals containing wavelengths $\lambda 1$ and $\lambda 2$ leave the system on the same output fiber, which is convenient for providing a compact unit providing the desired output. Also, each of the two wavelengths which leave the second lens of the second unit have experienced one transmittance and one reflectance, and accordingly the attenuation of each wavelength is the same. Using the same system, further filter units can be added to separate further selected wavelengths of light, and all selected wavelengths can be made to experience the same attenuation and to leave by the same optical fiber.

A similar system can be used in an optical circuit which includes an amplifier in each optical fiber which connects two lenses of two filter units.

BRIEF DESCRIPTION OF THE DRAWINGS

Exemplary embodiments of the invention will now be described by way of example with reference to the accompanying drawings, in which.

DETAILED DESCRIPTION

Figure 1:
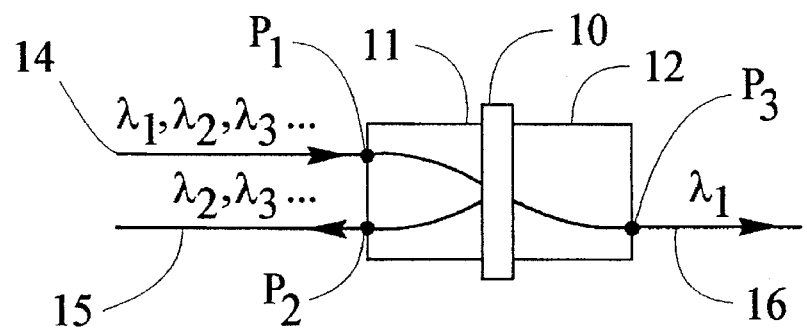
FIG. 1 shows a conventional three port wavelength-division multiplexer filter.
Figure 1A:
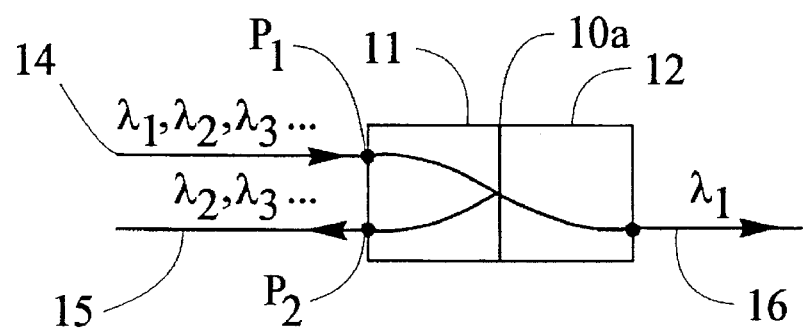
FIG. 1a shows a known kind of variation on the filter unit of FIG. 1.
Figure 2:
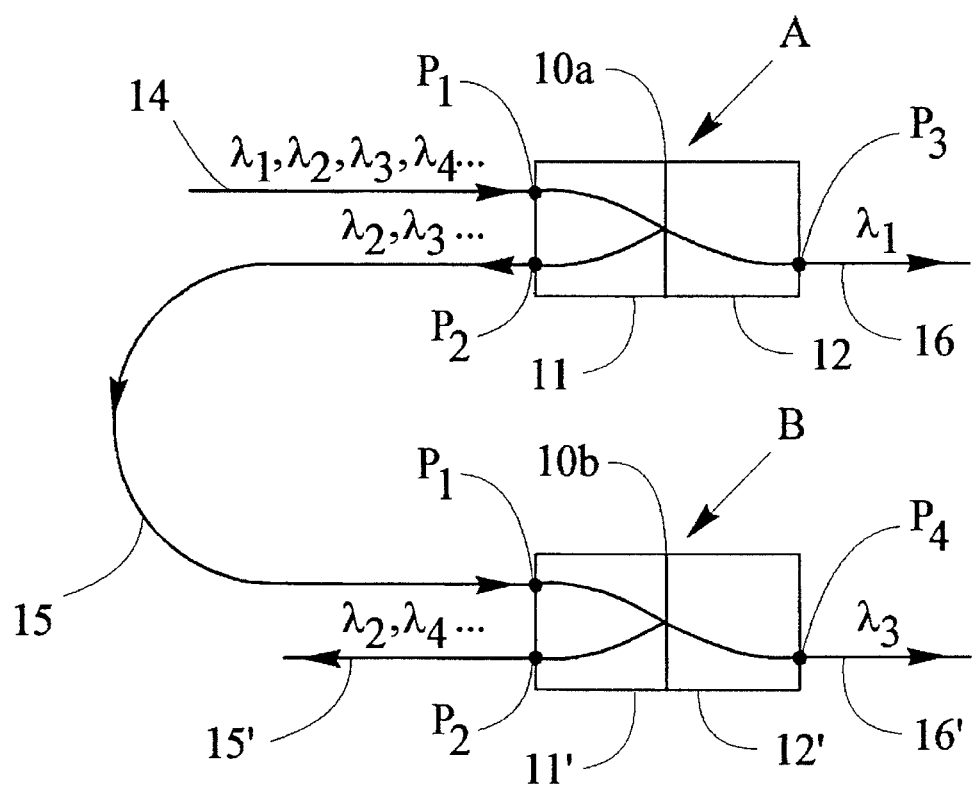
FIG. 2 shows how such units can be used to separate more than one wavelength from an input having several wavelengths.
Figure 3:
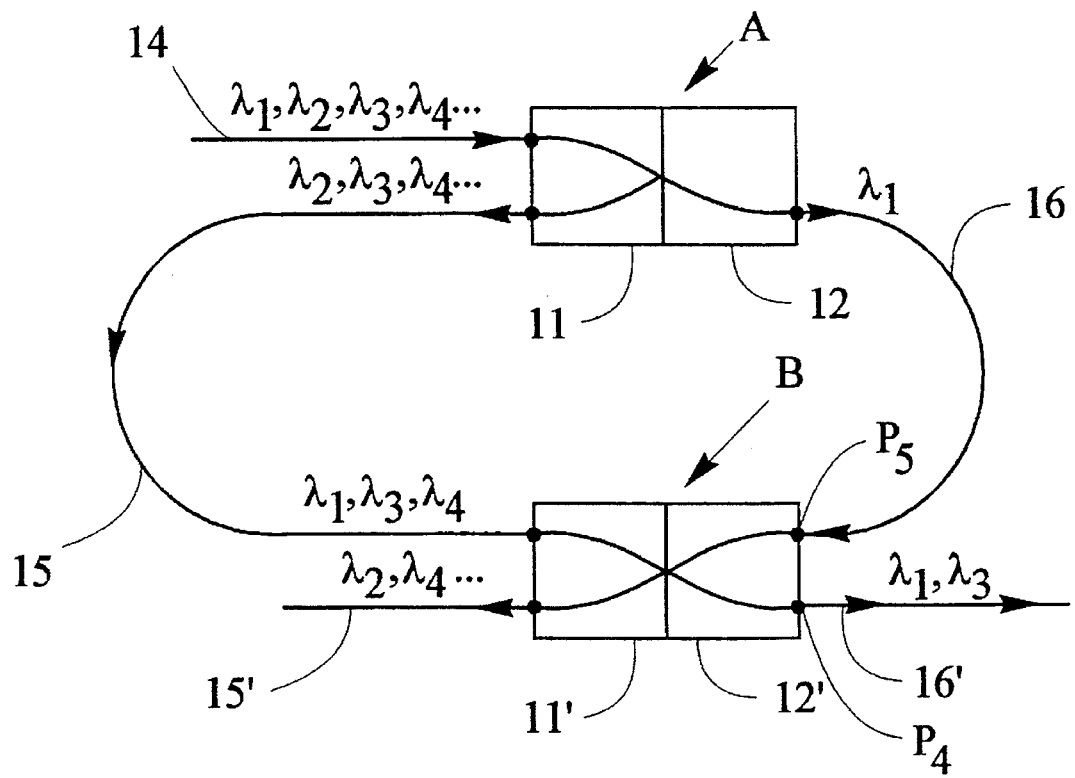
FIG. 3 shows an arrangement in accordance with the invention for separating two wavelengths from an input having several wavelengths.

FIG. 3, showing the inventive arrangement, is similar to FIG. 2 in respect of the arrangement of the filter unit comprising lenses 11 and 12 on each side of filter element 10b, and in the arrangement of the input fiber 14, first connecting optical fiber or reflected light fiber 15, second connecting optical fiber 16, and second reflected light fiber 15'. However, in this case, the fiber 16 is connected to an input port P5 on the second lens 12' of the second unit B, and this input port P5 is arranged relative to port P4 so that light received from fiber 16 leaves the lens 12' by the same fiber 16' as receives the transmitted light from the fiber 15. Also, the wavelengths $\lambda 1$ and $\lambda 3$ of light which leave the system have each experienced one transmittance and one reflectance and attenuation for each wave length is equal.

Figure 4:
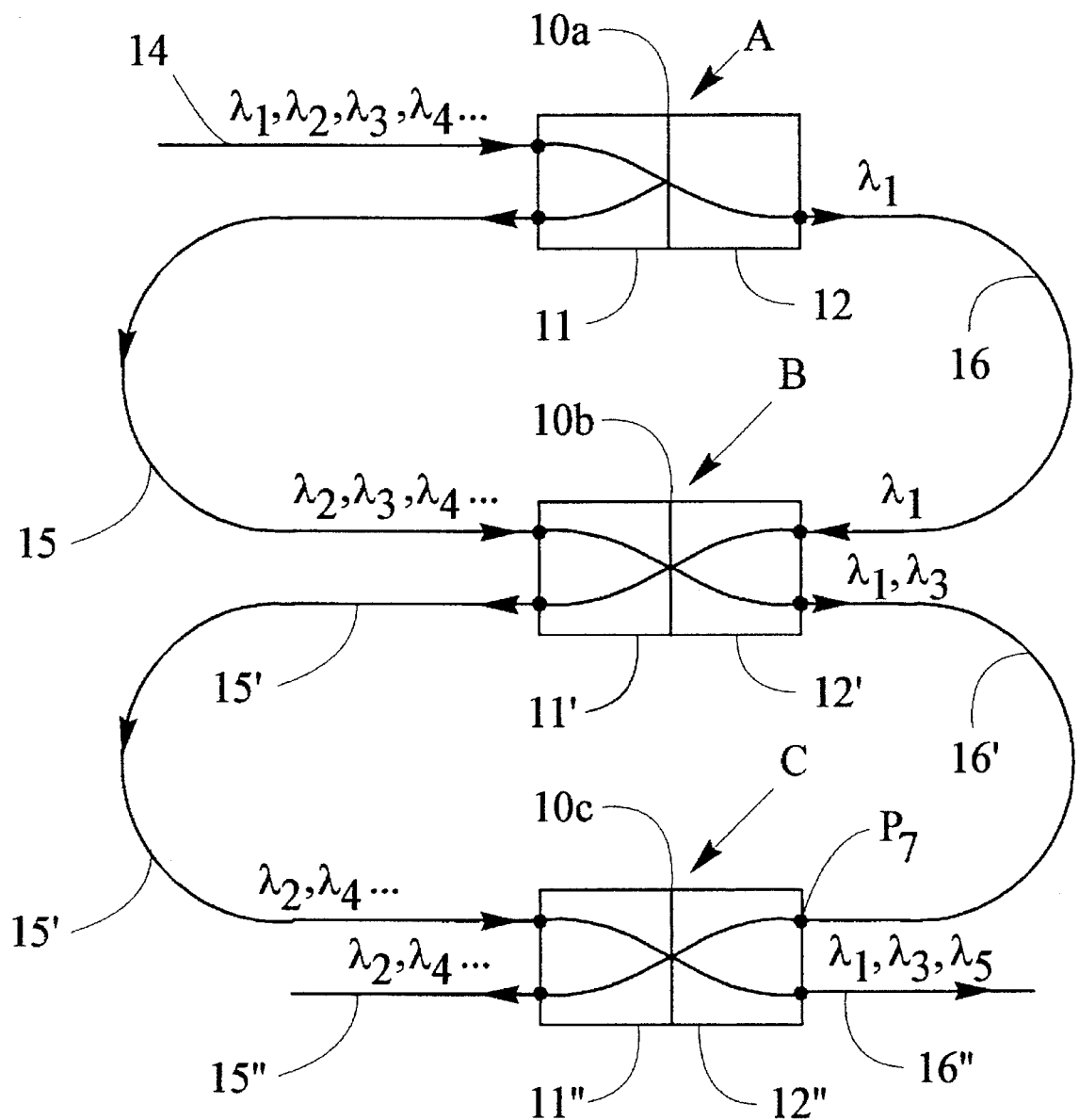
FIG. 4 shows an arrangement for separating three wavelengths from an input having several wavelengths.

FIG. 4 shows how this system can be expanded to separate light of three wavelengths from an input light signal having three or more wavelengths. The first two stages of the system are the same as the system of FIG. 3. The third stage is provided by third filter unit C having a first lens 11" and a second lens 12" separated by a filter element 10c capable of passing a third wavelength $\lambda 5$ and of reflecting all other wavelengths. The first lens 11" is connected to the second reflected light fiber 15' leaving the second lens 11' of the second unit (and which constitutes a third connecting fiber), and also has a connection to a yet further fiber 15" in reflecting light relationship to the fiber 15'. The second lens 12" is connected to the output fiber 16' of the second unit at port P7 which is in reflecting light relationship with the final output fiber 16". This final output fiber receives the three wavelengths $\lambda 1$, $\lambda 3$ and $\lambda 5$, which at this stage have been attenuated as follows:

$\lambda 1$:TRR:

$\lambda 3$:RTR:

$\lambda 5$:RRT:

Accordingly the attenuation of each wavelength is identical.

It will be evident that further stages such as D,E . . . can be added to separate further wavelengths, with all the wavelengths leaving through a common optical fiber and all having wavelength which have experienced the same amount of attenuation.

Figure 5:
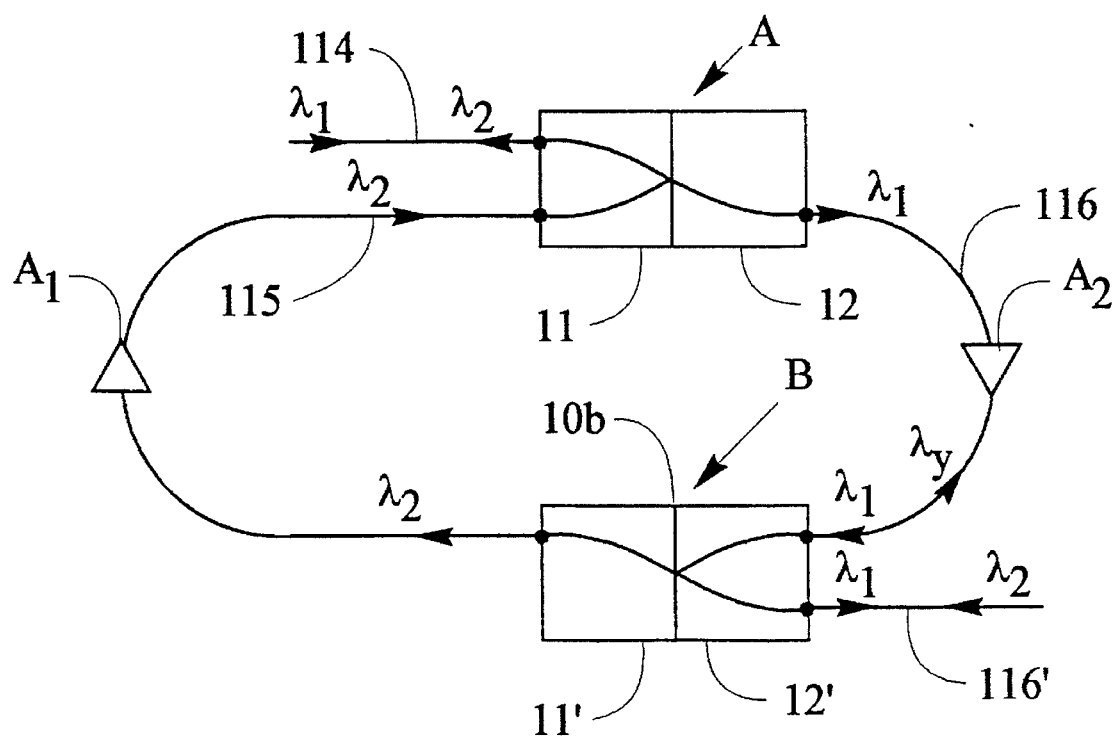
FIG. 5 shows a similar system using light amplifiers.

FIG. 5 shows how the basic system of the invention, as shown in FIG. 3, can also be used for light signal circuits containing amplifiers.

As shown, the system of FIG. 5 is similar to that of FIG. 3 in having two filter units A and B, with first and second lenses 11, 11', 12 and 12" respectively, and with filter elements 10a and 10b respectively. The lenses are connected to optical fibers 114, 115, 116 and 116' corresponding to fibers 14, 15, 16 and 16' of FIG. 3. However here the fiber 114 receives wavelengths $\lambda 1$, while providing an output fiber for light of wavelength $\lambda 2$. Conversely, the fiber 116' provides an output fiber for light of wavelength $\lambda 1$, while also providing an input for light of wavelengths $\lambda 2$.

Filter unit A transmits light of wavelength $\lambda 1$, which leaves by second connecting fiber 116 and then passes through amplifier A2. This amplified light signal passes into the second lens 12' of unit B, where it is reflected off filter element 10b to leave lens 12' via output fiber 116'. Accordingly this fiber provides an outlet for filtered and amplified light of wavelength $\lambda 1$.

The fiber 116' also provides an inlet for light of wavelength $\lambda 2$ which passes through element 10b and enters the fiber 115, in which it is amplified by amplifier A1, thence passing into lens 11 of the first unit A, being reflected off element 10a, and leaving the system via fiber 114 as amplified, filtered light of wavelength $\lambda 2$.

Figure 6:
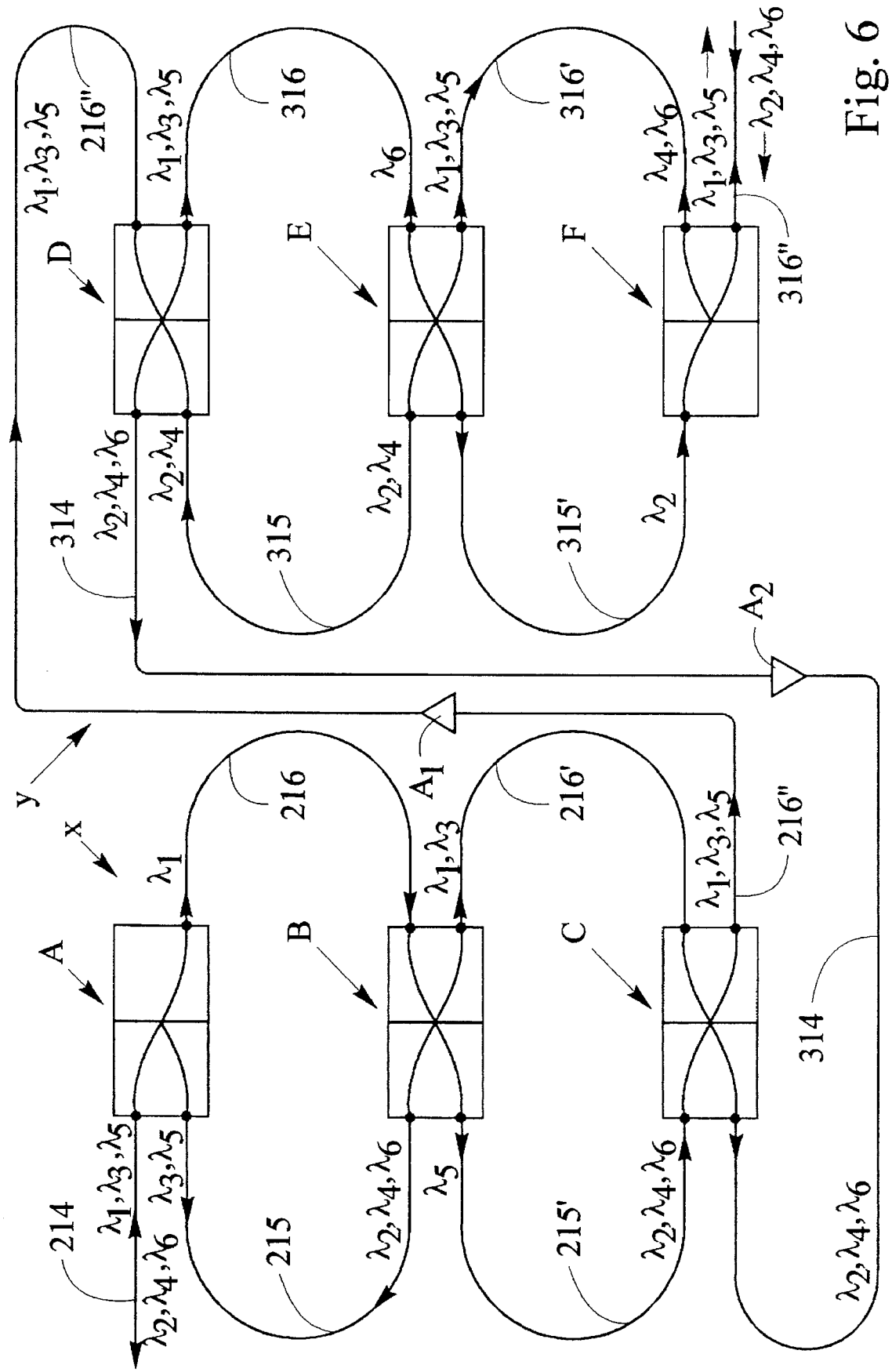
FIG. 6 shows a more complex system using light amplifiers.

FIG. 6 shows a more complex circuit using two of the circuits shown in FIG. 4, separated by amplifiers. The first circuit X has filter units A, B, C, capable of passing light of wavelengths λ1, λ5, λ5 respectively and reflecting other wavelengths. Its input fiber 214 serves as input for wavelengths λ1, λ3, λ5, λx . . . and, after passing through the circuit in similar manner to that described in relation to FIG. 4, filtered light of wavelengths λ1, λ3, λ5 leaves the circuit through output fiber 216" and passes through amplifier A1 on its way to the second circuit Y. Here it enters the unit D, which is effectively the third unit of this circuit, is reflected into connecting fiber 316, is again reflected by unit E into connecting fiber 316', and is lastly reflected by unit F into outlet fiber 316". This fiber 316" also serves as an input fiber for light of wavelengths λ2, λ4, λ6. Of these wavelengths, λ2 is passed by unit F and goes into connecting fiber 315', after which it is reflected by units E and D and leaves the circuit via fiber 314. Light of wavelengths λ4 and λ6 is reflected by unit F and goes to unit E via connecting fiber 316', where wavelength λ4 passes through and joins wavelength λ2. Light of wavelength λ6 is reflected by unit E into fiber 316, and afterwards passes through unit D to leave circuit Y via fiber 314. The exiting wavelengths λ2, λ4, λ6 are amplified by amplifier A2, and then pass into circuit X via the first lens of unit C. Subsequently, this light is reflected by units C,B, and A, passing through the connecting fibers 215' and 215 and finally leaving via fiber 214 which thus serves as outlet fiber for these wavelengths.

Accordingly the system produces amplified light of wavelengths λ1, λ2, and λ5 from outlet fiber 316", and amplified light of wavelengths λ2, λ4, and λ6 from fiber 214.

Figure 7:
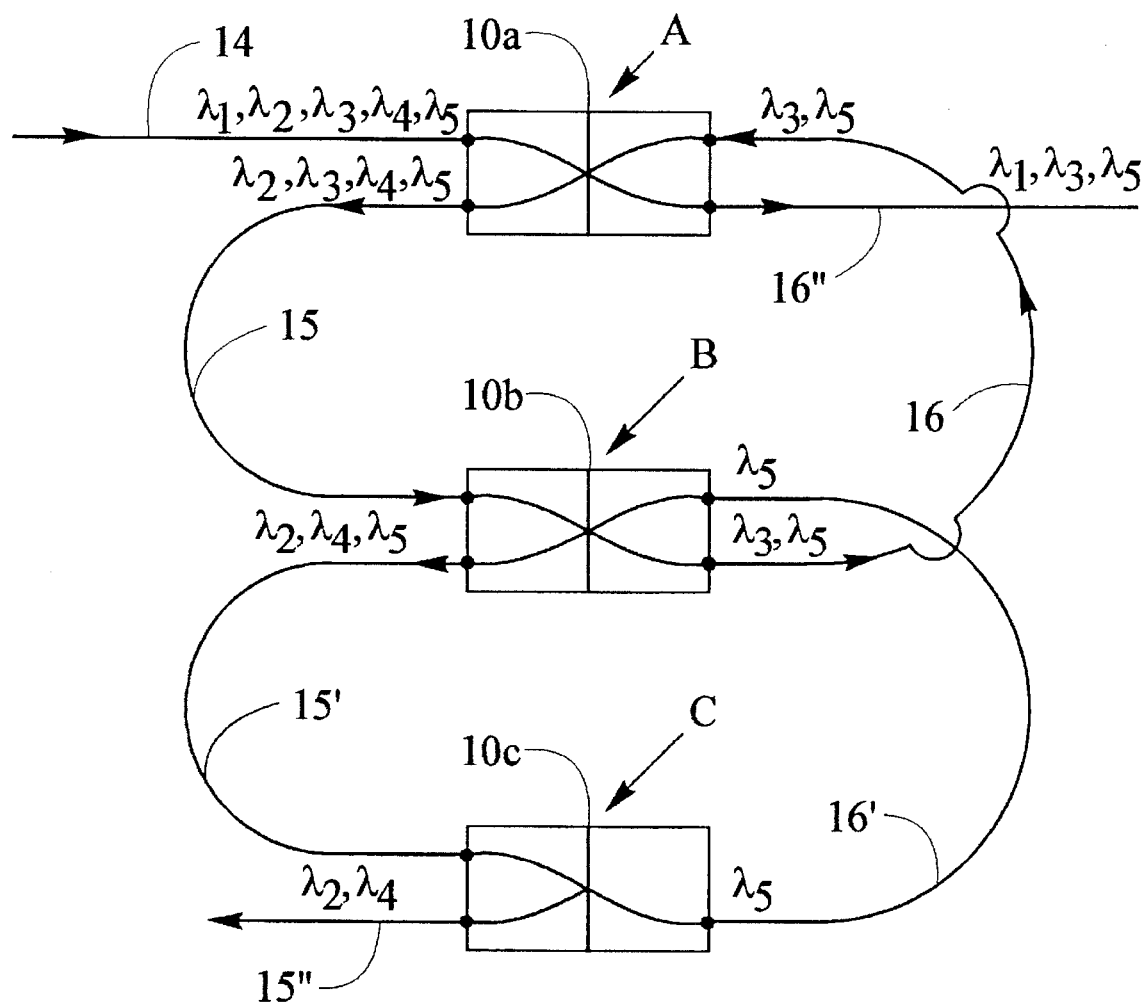
FIG. 7 shows a variation of the system shown in FIG. 4.

FIG. 7 shows a variation of FIG. 4, which is designed for minimum attenuation of one wavelength, i.e. λ1, but at the cost of increasing attenuation for wavelength λ5. Here, the input fiber 14, connecting fibers 15, 15', and further fiber 15" are arranged as in FIG. 4. However, the input fiber 14 is in direct transmission relationship with output fiber 16" through the first filter unit A. Also, instead of fiber 15' communicating through the filter element 10c with output fiber 16", here it is in communication with connecting fiber 16', which, together with connecting fiber 16, carries the light of wavelength λ5 back through reflections off the elements of units A and B into fiber 16". Light of wavelength λ3 is reflected by filter element 10a but passed by element 10b of unit B, and joins wavelength λ5 in passing through fiber 16 and thence to outlet fiber 16". The attenuations experienced by the wavelengths are as follows:

λ1:T
λ2:RTR;
λ3:RRTRR.

It will be seen that such arrangements may be used to design systems which will particularly favour certain wavelengths.

What we claim is:

1. A wavelength filter for use with optical fibers, comprising a plurality of filter units, each unit comprising first and second collimating lenses separated by a filter element, the filter elements of the two units being capable of passing first and second wavelengths respectively, and each unit being such as to reflect light transmitted by the filter element of each of the other units, wherein a first of said units has its first lens connected to the first lens of the second unit by a first connecting fiber, while the second lens of the first unit is connected to the second lens of the second unit by a second connecting fiber, wherein an input optical fiber carrying light with a plurality of wavelengths is connected to the first lens of the first unit and positioned so that one of the input and first connecting optical fibers is capable of receiving light from the other fiber reflected off the filter element of the first unit, and wherein an output optical fiber is connected to the second lens of one of the units, said second connecting optical fiber and said output optical fiber are positioned so that one is capable of receiving light from the other reflected off the filter element of said one unit.

2. A wavelength filter according to claim 1, wherein said one unit to which the output optical fiber is connected is the said second unit.

3. A wavelength filter for use with optical fibers, comprising a plurality of filter units, each unit comprising first and second collimating lenses separated by a filter element, the filter elements of the two units being capable of passing first and second wavelengths respectively, and each unit being such as to reflect light transmitted by the filter element of each of the other units, wherein a first of said units has its first lens connected to an input optical fiber and also connected to a first connecting optical fiber positioned so that one of said input and first connecting optical fibers is capable of receiving light from the other fiber reflected off the filter element of the first unit, said first unit having its second lens connected to a second connecting optical fiber carrying light of a first wavelength transmitted from said input optical fiber through the first filter unit, and wherein a second of said units has its first lens connected to said first connecting optical fiber and its second lens connected to the second connecting optical fiber and to output optical fiber means in transmitted light relationship with the first connecting optical fiber, said second connecting optical fiber and said output optical fiber means being positioned so that one is capable of receiving light from the other reflected off the filter element of said second unit.

4. A wavelength filter for use with optical fibers, comprising a plurality of filter units, each unit comprising first and second collimating lenses separated by a filter element, the filter element of each unit being arranged to reflect light transmitted by the filter element of each of the other units;

wherein a first of said units has its first lens connected to an input optical fiber carrying a plurality of wavelengths and also to a first connecting optical fiber positioned to receive light from the input optical fiber reflected off the filter element of the first unit, and has its second lens connected to a second connecting optical fiber carrying light of a first wavelength transmitted from the input optical fiber through the first filter unit, and wherein a second of said units has its first lens connected to said first connecting optical fiber, and its second lens connected to the second connecting optical fiber and to first output optical fiber positioned to receive light of a second wavelength transmitted through the second unit from the first connecting optical fiber and light of said first wavelength received from the second connecting optical fiber and reflected off the filter of the second unit, providing an output of filtered light exclusively of said first and second wavelengths.

5. A wavelength filter according to claim 4, including a third of said filter units, having its first lens connected to the first lens of the second filter unit by a third connecting optical fiber positioned for receiving light from the first connecting optical fiber which has been reflected from the filter element of the second filter unit, while said first output optical fiber connects the second lens of the second filter unit to the first lens of the third filter unit, said last mentioned lens being also connected to a further output optical fiber capable of receiving light of a third wavelength transmitted through said third filter unit from the third connecting optical fiber and light from the output optical fiber reflected off the filter element of the third filter unit, said further output optical fiber providing an output of filtered light exclusively of said first, second and third wavelengths.

6. A wavelength filter for use with optical fibers, comprising a plurality of filter units, each unit comprising first and second collimating lenses separated by a filter elements, the filter elements of the two units being capable of passing first and second wavelengths respectively, and each unit being such as to reflect light transmitted by the filter element of each of the other units, wherein a first of said units has its first lens connected to the first lens of the second unit by a first connecting fiber, while the second lens of the first unit is connected to the second lens of the second unit by a second connecting fiber, wherein an input optical fiber carrying light with a plurality of wavelengths is connected to the first lens of the first unit and positioned so that one of the input and first connecting optical fibers is capable of receiving light from the other fiber reflected off the filter element of the first unit, wherein an output optical fiber is connected to the second lens of one of the units, said second connecting optical fiber and said output optical fiber are positioned so that one is capable of receiving light from the other reflected off the filter element of said one unit, and wherein the first connecting optical fiber is provided with amplifier means which allow light signals to move only from the second filter unit to the first filter unit, and wherein the second connecting optical fiber is connected to the second filter unit through an amplifier which allows light signals to move only from the first filter unit to the second filter unit.

\* \* \* \* \*

UNITED STATES PATENT AND TRADEMARK OFFICE
CERTIFICATE OF CORRECTION

PATENT NO. : 5,629,995
DATED : May 13, 1997
INVENTOR(S) : Duck, et. al.

It is certified that error appears in the above-indentified patent and that said Letters Patent is hereby corrected as shown below:

In each occurrence listed below, the word "fight" should read -- light --.

Col. 2, lines 12, 13, 16, 18, 28, 36, 42, 47, 49, 50, 51, 52, 62, 65;

Col 3, lines 11 and 14;

Col 6, lines 37, 42, 50, 58, and 61.

Signed and Sealed this

Fourteenth Day of October, 1997

Attest:

BRUCE LEHMAN

Attesting Officer      Commissioner of Patents and Trademarks